United States Patent
Williams et al.

(10) Patent No.: US 10,228,942 B2
(45) Date of Patent: Mar. 12, 2019

(54) INSTRUCTION SAMPLING WITHIN TRANSACTIONS

(71) Applicant: ARM LIMITED, Cambridge (GB)

(72) Inventors: Michael John Williams, Ely (GB); John Michael Horley, Hauxton (GB); Stephan Diestelhorst, Cambridge (GB)

(73) Assignee: ARM Limited, Cambridge (GB)

( * ) Notice: Subject to any disclaimer, the term of this patent is extended or adjusted under 35 U.S.C. 154(b) by 91 days.

(21) Appl. No.: 15/532,286

(22) PCT Filed: Nov. 23, 2015

(86) PCT No.: PCT/GB2015/053561
§ 371 (c)(1),
(2) Date: Jun. 1, 2017

(87) PCT Pub. No.: WO2016/102920
PCT Pub. Date: Jun. 30, 2016

(65) Prior Publication Data
US 2017/0337115 A1    Nov. 23, 2017

(30) Foreign Application Priority Data

Dec. 23, 2014  (GB) .................................. 1423041.1
Dec. 23, 2014  (GB) .................................. 1423042.9
Jan. 7, 2015   (GB) .................................. 1500183.7

(51) Int. Cl.
G06F 11/00    (2006.01)
G06F 9/30     (2018.01)
(Continued)

(52) U.S. Cl.
CPC ........ G06F 9/30043 (2013.01); G06F 9/3004 (2013.01); G06F 9/3834 (2013.01);
(Continued)

(58) Field of Classification Search
USPC .......................................................... 714/35
See application file for complete search history.

(56) References Cited

U.S. PATENT DOCUMENTS

2011/0167247 A1   7/2011  Gibbs et al.
2012/0030518 A1*  2/2012  Rajwar ............... G06F 11/3476
                                                  714/38.13
(Continued)

FOREIGN PATENT DOCUMENTS

WO    WO 2013/136737    9/2013

OTHER PUBLICATIONS

International Search Report for PCT/GB2015/053561, dated Mar. 1, 2016, 3 pages.
(Continued)

Primary Examiner — Sarai E Butler
(74) Attorney, Agent, or Firm — Nixon & Vanderhye P.C.

(57) ABSTRACT

A data processing apparatus (4) includes processing circuitry (6) for executing program instructions that form part of a transaction which executes to generate speculative updates and to commit the speculative updates if the transaction completes without a conflict. Instruction sampling circuitry (44) captures instruction diagnostic data (IDD) relating to execution of a sampled instruction. Transaction tracking circuitry (46) detects if the sampled instruction is within a transaction and if so, tracks whether the speculative updates associated with the transaction are committed and captures transaction diagnostic data (TDD) indicative of whether or not the speculative updates were committed. Thus, both instruction diagnostic data relating to a sampled instruction and transaction diagnostic data relating to the fate of a transaction containing a sampled instruction are captured.

15 Claims, 9 Drawing Sheets

(51) Int. Cl.
  *G06F 11/36*  (2006.01)
  *G06F 9/38*  (2018.01)
  *G06F 9/455*  (2018.01)
  *G06F 9/46*  (2006.01)
  *G06F 12/08*  (2016.01)
  *G06F 12/126*  (2016.01)

(52) U.S. Cl.
  CPC ............ *G06F 9/3842* (2013.01); *G06F 9/455* (2013.01); *G06F 9/46* (2013.01); *G06F 9/467* (2013.01); *G06F 11/362* (2013.01); *G06F 11/3636* (2013.01); *G06F 12/08* (2013.01); *G06F 12/126* (2013.01)

(56) References Cited

U.S. PATENT DOCUMENTS

| | | | |
|---|---|---|---|
| 2012/0179877 A1* | 7/2012 | Shriraman | G06F 9/524 711/141 |
| 2013/0247010 A1* | 9/2013 | Bradbury | G06F 9/3005 717/130 |
| 2013/0339328 A1 | 12/2013 | Greiner et al. | |
| 2014/0188783 A1* | 7/2014 | Agarwal | G06F 17/30563 707/602 |

OTHER PUBLICATIONS

Written Opinion of the ISA for PCT/GB2015/053561, dated Mar. 1, 2016, 8 pages.
Search Report for GB1423042.9, dated Jun. 22, 2015, 3 pages.

\* cited by examiner

INSTRUCTION SAMPLING WITHIN TRANSACTIONS

This application is the U.S. national phase of International Application No. PCT/GB2015/053561 filed 23 Nov. 2015, which designated the U.S. and claims priority to GB Patent Application No. 1423042.9 filed 23 Dec. 2014, GB Patent Application No. 1423041.1 filed 23 Dec. 2014, and GB Patent Application No. 1500183.7 filed 7 Jan. 2015, the entire contents of each of which are hereby incorporated by reference.

This invention relates to the field of data processing systems.

It is known to provide data processing systems incorporating instruction sampling mechanisms whereby data concerning the state of the data processing system and the execution of a program instruction is sampled when a trigger condition is met. These mechanisms typically allow the behavior of the system to be statistically profiled to provide information which may be useful in debugging and/or performance tuning the system.

In at least some example embodiments of the disclosure there is provided apparatus for processing data, said apparatus comprising:

processing circuitry to execute program instructions including a transaction comprising a plurality of program instructions that execute to generate speculative updates to state data and to commit said speculative updates if said transaction completes without a conflict;

instruction sampling circuitry to capture instruction diagnostic data relating to execution of a sampled instruction by said processing circuitry; and transaction tracking circuitry:
to detect if said sampled instruction is within said transaction; and
if said sampled instruction is within said transaction, then to track whether said speculative updates are committed and to capture transaction diagnostic data indicative of whether said speculative updates were committed.

In at least some example embodiments of the disclosure there is provided apparatus for processing data, said apparatus comprising:

processing means for executing program instructions including a transaction comprising a plurality of program instructions that execute to generate speculative updates to state data and to commit said speculative updates if said transaction completes without a conflict;

instruction sampling means for capturing instruction diagnostic data relating to execution of a sampled instruction by said processing circuitry; and transaction tracking means:
for detecting if said sampled instruction is within said transaction; and
if said sampled instruction is within said transaction, then for tracking whether said speculative updates are committed and for capturing transaction diagnostic data indicative of whether said speculative updates were committed.

In at least some example embodiments of the disclosure there is provided a method of processing data, said method comprising:

executing program instructions including a transaction comprising a plurality of program instructions that execute to generate speculative updates to state data and to commit said speculative updates if said transaction completes without a conflict;

capturing instruction diagnostic data relating to execution of a sampled instruction by said processing circuitry;

detecting if said sampled instruction is within said transaction; and if said sampled instruction is within said transaction, then tracking whether said speculative updates are committed and capturing transaction diagnostic data indicative of whether said speculative updates were committed.

Example embodiments will now be described, by way of example only, with reference to the accompanying drawings:

FIG. 1 schematically illustrates a stream of program instructions including a transaction;

FIG. 2 schematically illustrates a data processing system for executing program instructions;

FIGS. 3A and 3B are flow diagrams schematically illustrating transaction execution;

FIG. 4 schematically illustrates debug and diagnostic circuitry;

FIG. 5 schematically illustrates a first example of generating and outputting diagnostic data and transaction diagnostic data;

Figure 1:
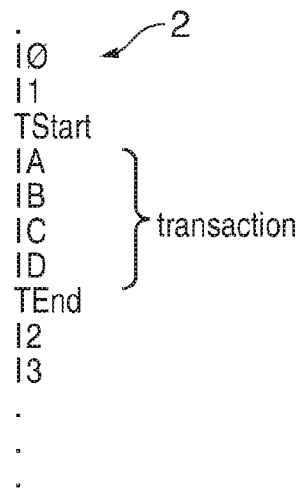

Within processing systems which support transactions, such as systems incorporating transactional memory, a plurality of program instructions execute to generate speculative updates to state data (e.g. architectural state specula-tive updates) and operate to permit (commit) those speculative updates if the transaction concerned completes without a conflict. As an example, a transaction may include load or store operations to memory locations and if those load and store operations complete without an access from outside the transaction attempting to make a conflicting (or potentially conflicting) access to the same memory locations, then the results of those transactions are committed and update the architectural system state. If there is a conflict, then the transaction aborts and saved previous state data is used to "roll back" the state of the system to a point before the transaction was executed. The transaction may then be repeated sometime later to see if it completes without a conflict arising, may give rise to an exception, may be executed in a different way (e.g. using a lock mechanism) or otherwise processed depending upon the particular form of the system concerned.

Other types of conflicts that can cause a transaction to abort include exhaustion of resources for managing a transaction (e.g. temporary storage, depth counter for nested transactions etc) or an exception, such as a data abort (MMU fault), interrupt etc interrupting the transaction.

When performing instruction sampling, the captured instruction diagnostic data relates to the execution of the sampled instruction by the processing circuitry. However, in the case of a sampled instruction within a transaction, then an important diagnostic characteristic associated with that sampled instruction is, for example, whether or not the transaction of which it is part completed such that its speculative updates were committed. Accordingly, there may be provided transaction tracking circuitry in conjunction with instruction sampling circuitry. The transaction tracking circuitry serves to detect if a sampled instruction is within a transaction and then, if this is the case, to track whether the speculative updates associated with that transaction are committed and to capture transaction diagnostic data indicative of whether or not those speculative updates were committed.

In some embodiments, the transaction tracking circuitry may also be responsible for writing the transaction diagnostic data to a memory after processing of the transaction has finished. In other embodiments the transaction tracking circuitry may serve to write the transaction diagnostic data to a trace data stream after the processing of the transaction is finished. The instruction diagnostic data may be written to the memory or the trace data stream by the sampling circuitry together with the transaction diagnostic data in some embodiments. When the instruction diagnostic data and the transaction diagnostic data are written together to the memory or the trace data stream, these may be arranged to form part of a fixed-size diagnostic data record. Such a fixed-size diagnostic data record may be conveniently managed within the memory system in a way in which the writing of such diagnostic data has a reduced impact upon the behavior of the system and accordingly a reduced impact upon the validity of the diagnostic characteristics observed.

In some example embodiments, the transaction tracking circuitry and the sampling circuitry may be formed to respond to capture of further instruction diagnostic data for a further sampled instruction (e.g. one following the originally sampled instruction which was within a transaction) to write the instruction diagnostic data for the original sampled instruction, together with incomplete-transaction data indicating that the transaction has not yet finished. Thus, the instruction diagnostic data may be buffered until the next sampled instruction is encountered at which point if the associated transaction for the original sampled instruction has not completed, then both the original instruction diagnostic data and the incomplete-transaction data are output thereby relieving the buffer to store the instruction diagnostic data for the further sampled instruction. The instruction diagnostic data and the incomplete-transaction data may be written together as part of a fixed-size diagnostic data record as previously mentioned. Other embodiments may use a variable size diagnostic data record as suits their data characteristics.

In other example embodiments, the transaction tracking circuitry and the sampling circuitry may be formed to respond to capture of the instruction diagnostic data to write instruction diagnostic data together with within-a-transaction data indicating that the sample instruction is within the transaction. Thus, the writing of the instruction diagnostic data together with the within-a-transaction data need not wait until the transaction has finished. The instruction diagnostic data and the within-a-transaction data may be written as part of a variable-size diagnostic data record. The same is also true of the transaction diagnostic data within such a system as the transaction diagnostic data may be separately written to the instruction diagnostic data and may have a size which is considerably smaller than the instruction diagnostic data and accordingly would be inefficiently represented within a diagnostic data record that had a fixed size which was sufficient to accommodate the significantly larger data volume associated with the instruction diagnostic data.

In other example embodiments, the transaction tracking circuitry and the sampling circuitry may be formed to respond to capture of further instruction diagnostic data or a further sampled instruction (e.g. one following the initially sampled instruction) to write the further instruction diagnostic data together with previous-sample-transaction data indicating the status of the transaction that included the previously sampled instruction (e.g. the immediately preceding sampled instruction). Thus, the further instruction diagnostic data is accompanied by data which indicates the status of the transaction which included the previously sampled instruction (when this was within a transaction). Within such embodiments, the further instruction diagnostic data and the previous-sample-transaction data may form part of a fixed size diagnostic data record as previously mentioned.

The instruction diagnostic data and the transaction diagnostic data may in some embodiments be written into a memory. This memory may be a special purpose memory, or in other embodiments may be a memory which is also be used by memory access instructions within the program instructions executed by the processing circuitry.

It will be appreciated that the transaction diagnostic data can take a variety of different forms. In one example form the transaction diagnostic data may be indicative of one of that the transaction completed such that the speculative updates were committed or that the transaction aborted such that the speculative updates were not committed.

The sampling circuitry may be controlled to perform instruction diagnostic data capture in accordance with a variety of different triggering conditions. Examples of such triggering conditions include one or more of the expiry of a fixed interval, the expiry of a random interval, the expiry of a sum of a fixed interval plus a random interval, or in response to an external stimulus (e.g. a voltage at an external signal input).

It will be appreciated that the instruction diagnostic data may capture many different characteristics associated with the sampled instruction. These characteristics may include one or more of a program counter value of the sampled instruction, an exception level associated with the sampled instruction, a virtual machine identifier (VMID) associated with the sampled instruction, a context identifier (ASID) associated with the sampled instruction, a translation table base address value (TTB) in use when the sampled instruction was executed, a security state value(s) associated with the sampled instruction, a type (e.g. opcode) of the sampled instruction, whether the sampled instruction triggered a cache access, whether the sampled instruction triggered a cache miss, cycle count data associated with execution of at least part of the sampled instruction and/or whether changes of architectural state associated with the instruction were committed (e.g. in accordance with out-of-order processing).

FIG. 1 schematically illustrates a stream of program instructions 2 which may be executed by processing circuitry. It will be appreciated that this stream of program instructions may be one executing thread within a multi-threaded system. Alternatively, the stream of program instructions may be the only thread of program instructions executing. Within the stream of program instructions illustrated in FIG. 1, there are included a transaction start instruction TStart and a transaction end instruction TEnd. These instructions respectively indicate the boundaries of a transaction comprising instructions IA, IB, IC and ID. These instruction delimited by the TStart and the Tend are executed by the processing circuitry to generate speculative updates to state data. These speculative updates are stored within memory, or other storage resources, of the system (e.g. shadow registers, special purpose memory permitting roll back, and the like) until it is determined that the transaction has completed without a conflict at which point the speculative updates are committed to the system (e.g. update the architectural state of the system with the stored roll back data then being discarded freeing up the associated memory resource to support a further transaction).

Figure 2:
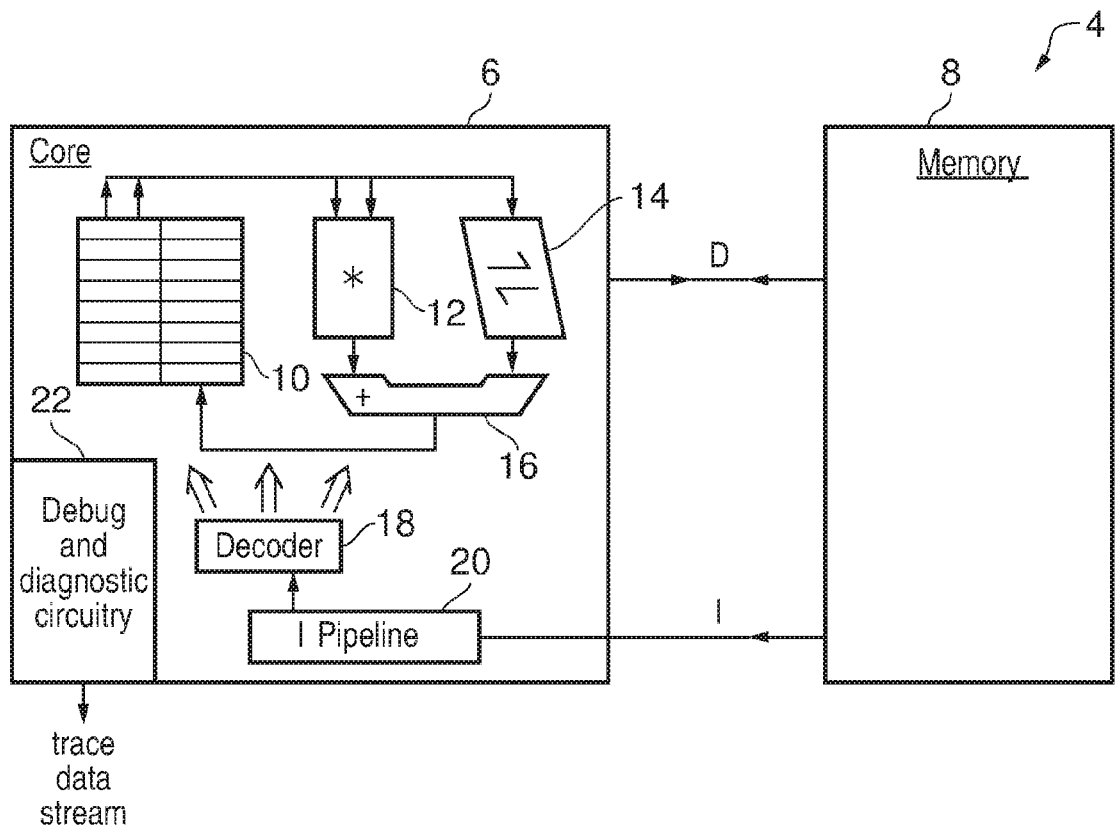

FIG. 2 schematically illustrates a data processing system 4 including a processor core 6 and a memory system 8. The memory system 8 may be a hierarchical system including one or more levels of cache memory as well as a main memory. The hierarchical memory system 8 may be shared with other processors, or with other threads running on the same processor. The processor core 6 provides processing circuitry for executing program instructions fetched from the memory 8. The results of the execution of the program instructions may be written back to the memory 8. Load and store program instructions may be used to read and write data from and to the memory 8. The processor core 6 includes a register bank 10, a multiplier 12, a shifter 14 and an adder 16 which together perform processing operations to execute the program instructions under control of control signals generated by an instruction decoder 18 as program instructions reach the decode stage within an instruction pipeline 20. Also associated with the processor core 6 is debug and diagnostic circuitry 22 which serves to perform, for example, instruction sampling to capture instruction diagnostic data and tracking of transactions which include sampled instructions so as to generate transaction diagnostic data. This instruction diagnostic data and transaction diagnostic data may be written out to the memory 8, or may be output in a trace data stream, depending upon the embodiment and/or the configuration when operating an embodiment supporting both potential output mechanisms.

Figure 3A:
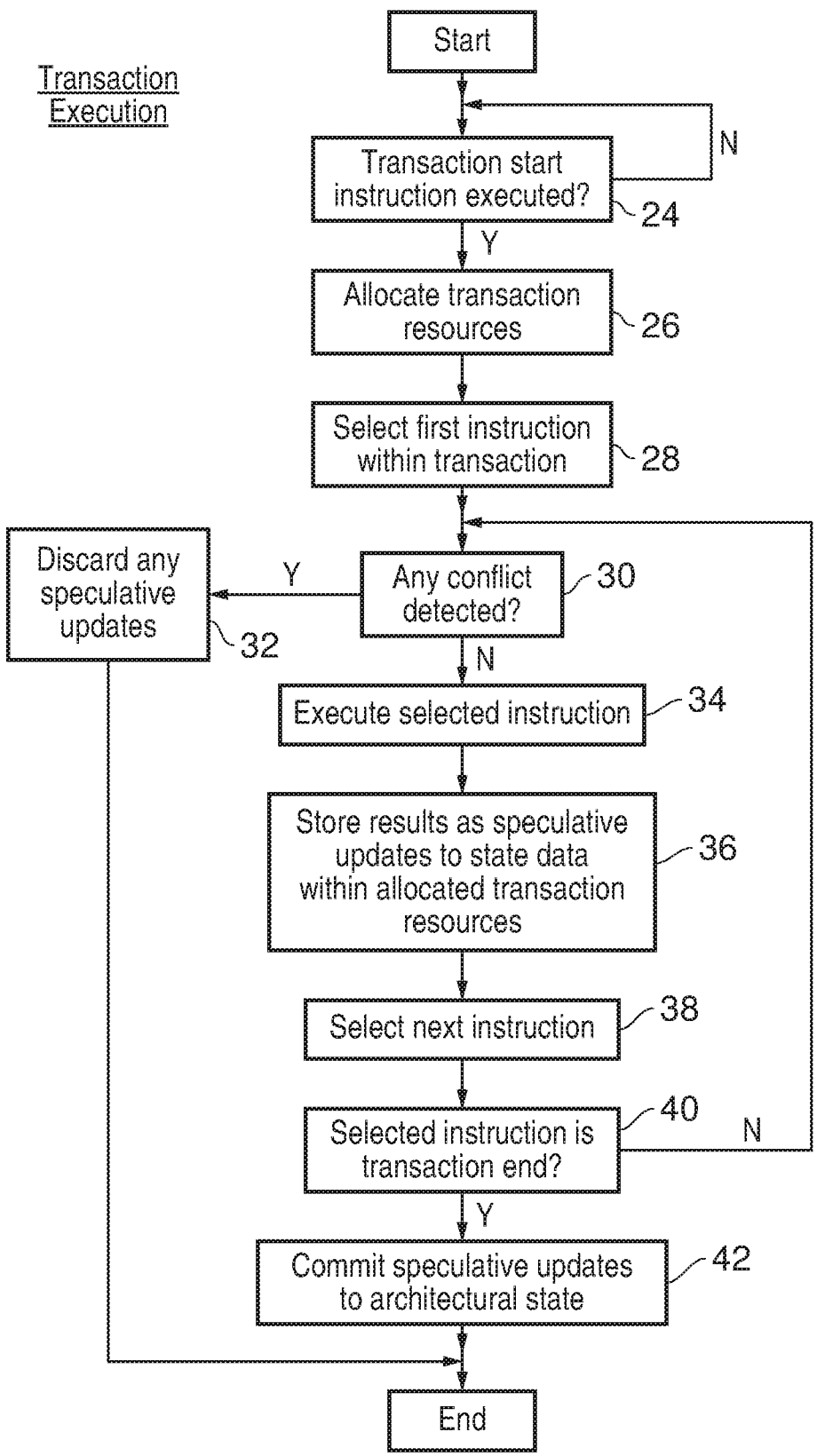

FIG. 3A is a flow diagram schematically illustrating the execution of a transaction comprising multiple program instructions. At step 24 processing waits until a transaction start instruction (TStart) is executed. Step 26 then allocates transaction resources to be used, for example, resources to store the speculative updates to state data prior to the transaction completing. Step 28 selects the first instruction within the transaction. Step 30 determines whether or not there are any conflicts detected at that time. If there are any such conflicts detected, then step 32 serves to discard any speculative updates, jump to a fix-up routine (or otherwise indicate to the software that the transaction has failed) and return the transaction resources allocated at step 26 for use in other transactions.

If there are no conflicts detected at step 30, then step 34 serves to execute the selected instruction. Step 36 then stores the results of the execution at step 34 as speculative updates to state data within the allocated transaction resources. Step 38 selects a next instruction. Step 40 determines whether or not the selected instruction is a transaction end instruction (TEnd). If the instruction is not a transaction end instruction, then processing returns to step 30. If the determination at step 40 is that the selected instruction is a transaction end instruction, then step 42 serves to commit the speculative updates stored within the allocated transaction resources so as to update the architectural state of the system.

Figure 3B:
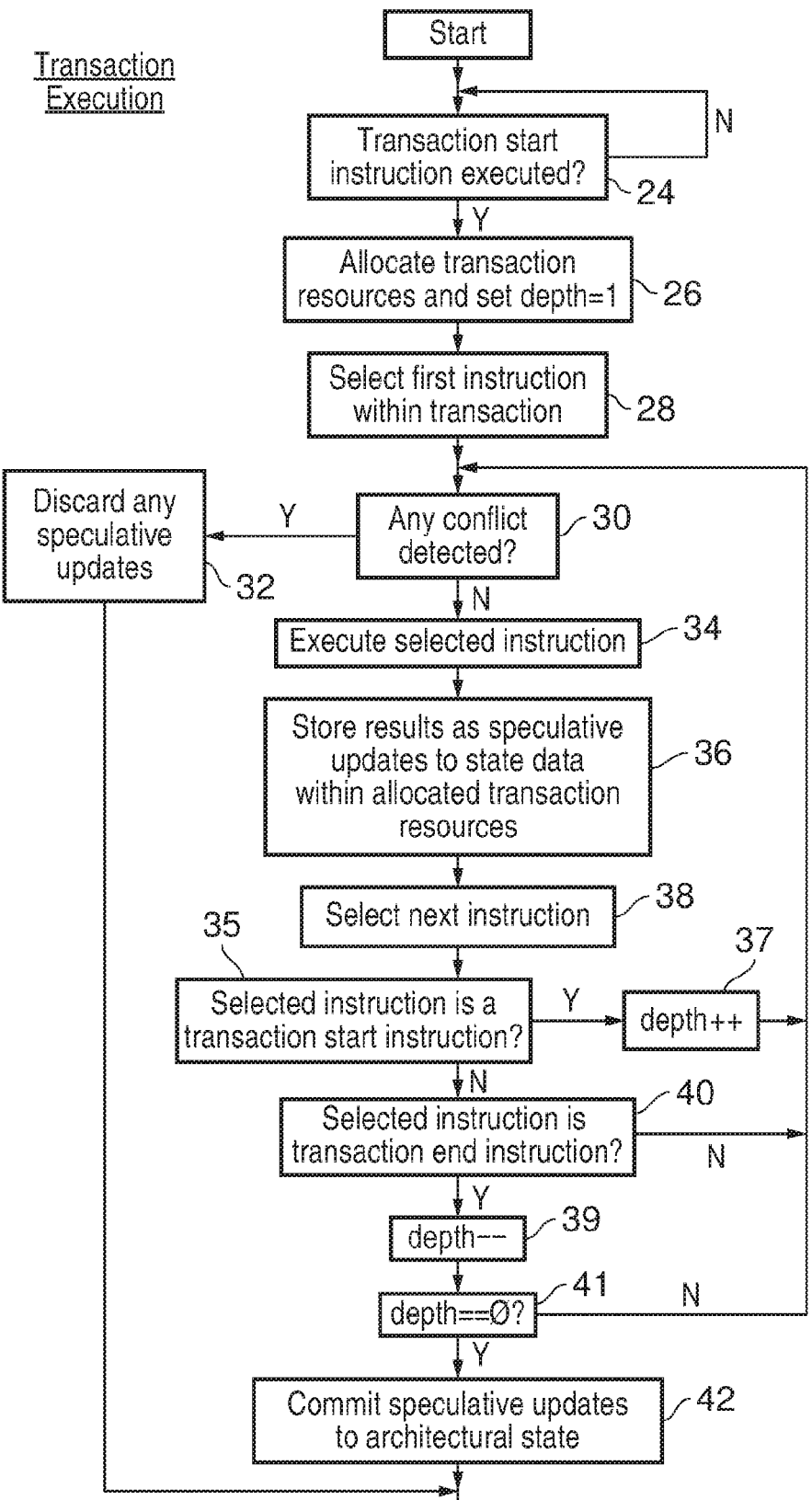

FIG. 3B is a flow diagram schematically illustrating the transaction execution of FIG. 3A modified to support flat transaction nesting. At step 26 a transaction nest depth counter is set to "1" when the transaction resources are allocated. After the next instruction is selected at step 38, step 35 determines if the selected instruction is a transaction start instruction. If the selected instruction is a transaction start instruction, then step 37 serves to increment the depth counter and processing returns to step 30.

If the determination at step 35 is that the selected instruction is not a transaction start instruction, then step 40 determines if the selected instruction is a transaction end instruction. If the selected instruction is not a transaction end instruction, then processing returns to step 30. If the selected instruction is a transaction end instruction, then step 39 decrements the depth counter and step 41 determines if the depth counter has a value equal to zero. If the depth counter does not equal zero, then processing again returns to step 30. If the depth counter does equal zero, then processing proceeds to step 42 as in FIG. 3A.

The action of FIG. 3B is to track the flat nested transaction depth and to commit the speculative updates stored in the allocated transaction resources, in response to the transaction started at step 24, when that same transaction is ended. An abort serves to abort all nested transactions. The transaction diagnostic data (TDD) output for a transaction may also include an indication of its "depth" within such an arrangement of nested transactions. It is also possible that other example embodiments may support true nesting of transactions.

Figure 4:
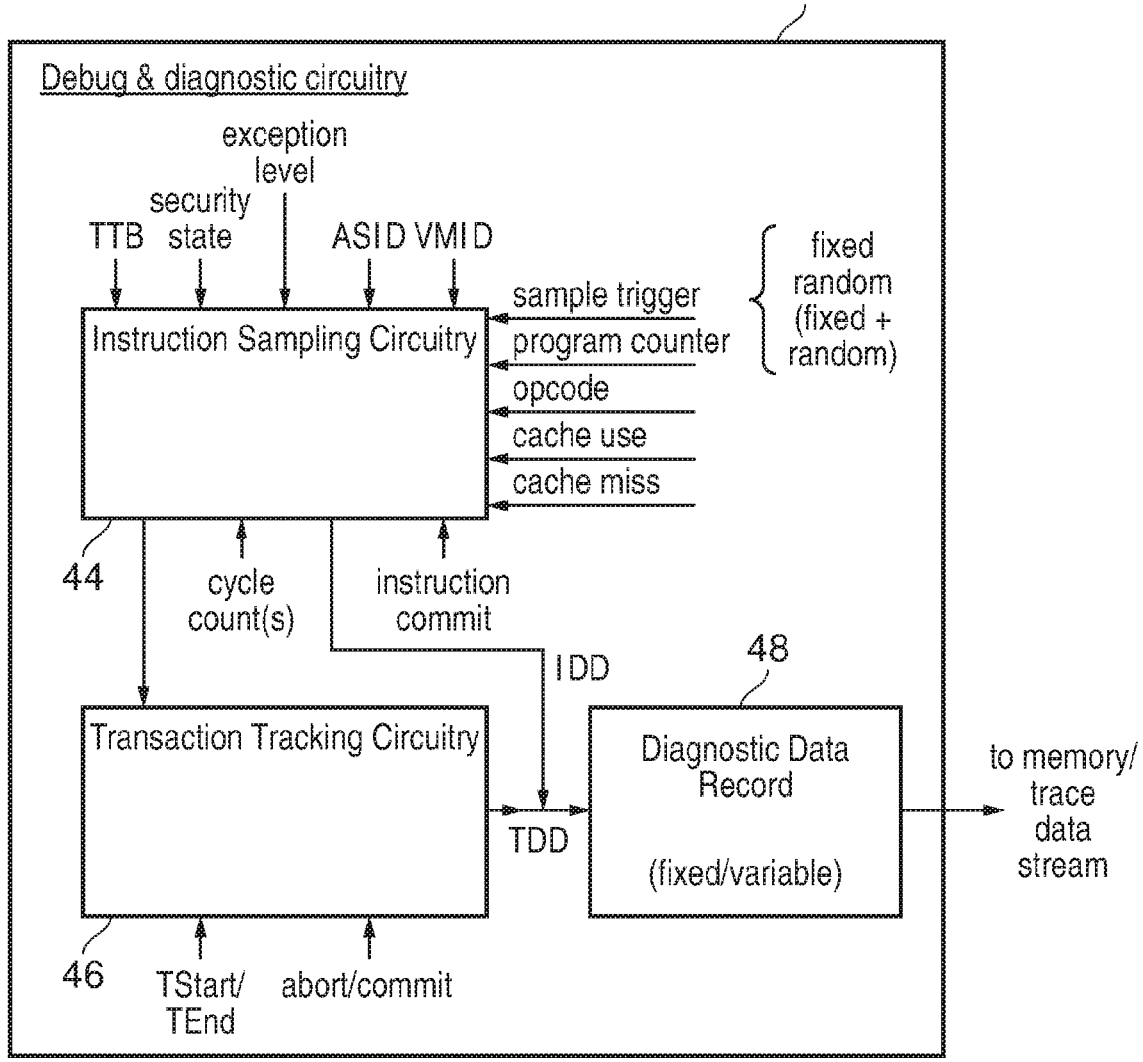

FIG. 4 schematically illustrates the debug and diagnostic circuitry 22 in more detail. This debug and diagnostic circuitry 22 includes instruction sampling circuitry 44 and transaction tracking circuitry 46. The instruction sampling circuitry receives a sample trigger input which serves to control the instruction sampling control circuitry 44 to capture diagnostic data associated with a sample instruction. The sample trigger may, for example, be associated with the expiry of a fixed interval, the expiry of a random interval, the expiry of the sum of a fixed interval and a random interval or with some external stimulus, such as a received external input signal. The instruction sampling circuitry 44 has inputs to it specifying for the sampled instruction parameters which my be represented by instruction diagnostic data (IDD). These parameters include, for example, a program counter value, an exception level, a virtual machine identifier (VMID), a context identifier (ASID), a translation table base address value (TTB) associated with a virtual address environment, a security state value(s) (e.g. whether the system is operating in a secure state or a non-secure state), an opcode (type) of the sampled instruction, whether the sampled instruction triggered a cache access, whether the sampled instruction triggered a cache miss, cycle count data associated with one or more parts of the sampled instruction, and/or whether or not the sampled instruction committed its architectural state. It will be appreciated that other combinations of characteristics may be combined to form the instruction diagnostic data (IDD).

The transaction tracking circuity 46 is responsive to the execution of transaction start or transaction end instructions within the program instructions being executed which mark the boundaries of a transaction. The transaction tracking circuitry may also track the transaction depth within nested transactions as described for FIG. 3B. Furthermore, the transaction tracking circuitry 46 determines for a given transaction identified whether or not that transaction was completed without a conflict and accordingly committed its speculative updates to the system state. Alternatively, the transaction may abort if a conflict arises and the speculative updates will be discarded without being committed to the system state. The transaction tracking circuitry 46 serves to detect whether a sampled instruction lies within a transaction, i.e. is between a transaction start instruction and a transaction end instruction. If this is the case, then the transaction tracking circuitry 46 tracks whether the speculative updates associated with that transaction are committed and captures transaction diagnostic data (TDD) indicating whether these speculative updates were committed (and if appropriate a nested transaction depth indicator for the sampled instruction). This transaction diagnostic data (TDD) is then output together with the instruction diagnostic data.

Record forming circuitry 48 serves to combine the instruction diagnostic data (IDD) and the transaction diagnostic data (TDD) into record diagnostic data which is then output in either fixed-size data records or variable-size data records depending upon the implementation concerned. In many cases the instruction diagnostic data (IDD) and the transaction diagnostic data (TDD) will be output together, but in some embodiments, it is also possible that they may be output separately.

Figure 5:
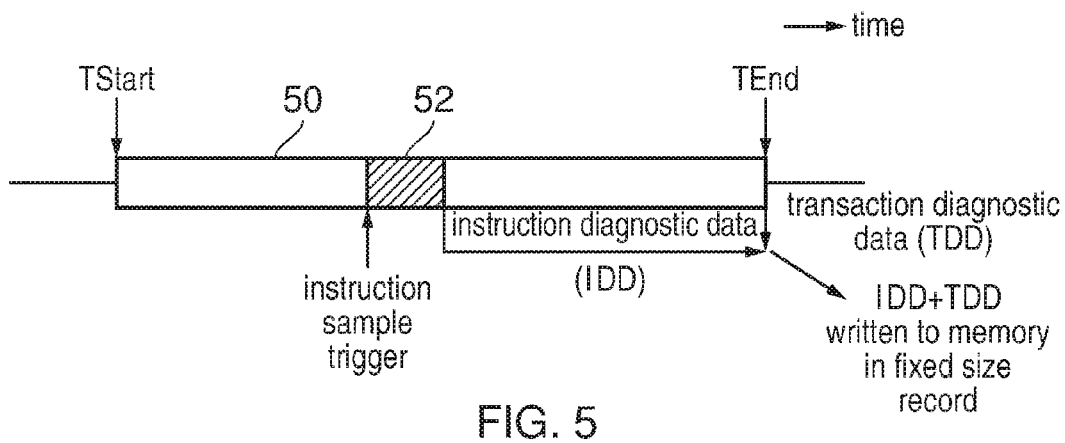

FIG. 5 schematically illustrates a first example embodiment. In this example a transaction 50 extends between a transaction start instruction and a transaction end instruction and includes a sampled instruction 52 identified by an instruction sample trigger. When the sampled instruction 52 is executed, then the instruction sampling circuitry 44 serves to capture instruction diagnostic data (IDD). This instruction diagnostic data (IDD) is buffered up to the end of the transaction 50 when the transaction diagnostic data (TDD) is determined indicating whether or not the transaction 50 committed or aborted. At this time, the instruction diagnostic data (IDD) and the transaction diagnostic data (TDD) are written out to memory (or a trace data stream) as part of a fixed sized data record.

Figure 6:
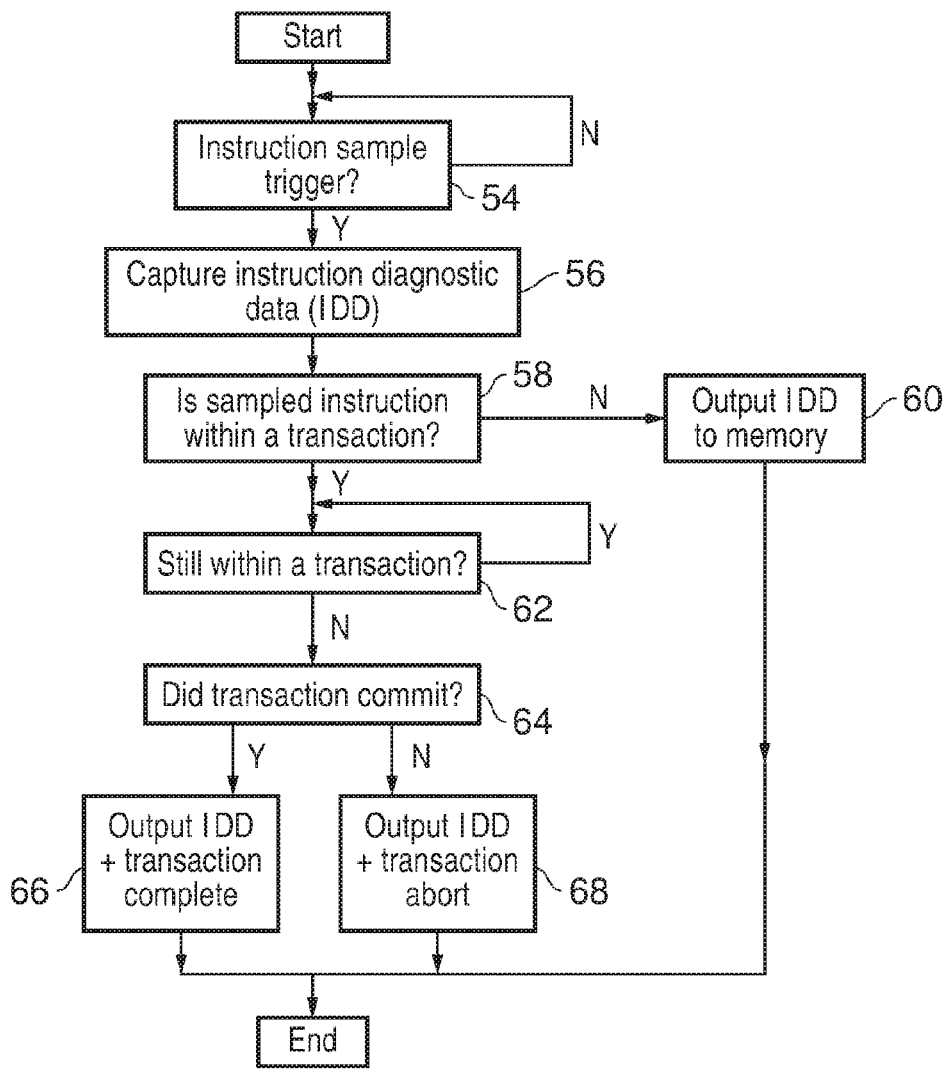
FIG. 6 is a flow diagram schematically illustrating control of the output of instruction diagnostic data and transaction diagnostic data in accordance with FIG. 5.

FIG. 6 is a flow diagram schematically illustrating operation in accordance with the example of FIG. 5. At step 54 processing waits until an instruction sample trigger is encountered. Step 56 then captures instruction diagnostic data (IDD). Step 58 determines whether or not the sampled instruction is within a transaction. If the sampled instruction is not within a transaction, then step 60 serves to output the instruction diagnostic data (IDD) without delay. If the sampled instruction is within a transaction, then processing proceeds to step 62 where a determination is made as to whether or not processing is still within a transaction (e.g. a single transaction has finished or when supporting flat nested transactions the transaction depth counter is zero). When not still within a transaction, processing proceeds to step 64 where a determination is made as to whether or not the transaction committed. If the transaction committed, then step 66 outputs the instruction diagnostic data (IDD) together with transaction diagnostic data (TDD) indicating that the transaction was completed. If the transaction did not commit, then processing proceeds to step 68 where the instruction diagnostic data (IDD) is output together with transaction diagnostic data (TDD) indicating that the transaction was aborted.

Figure 7:
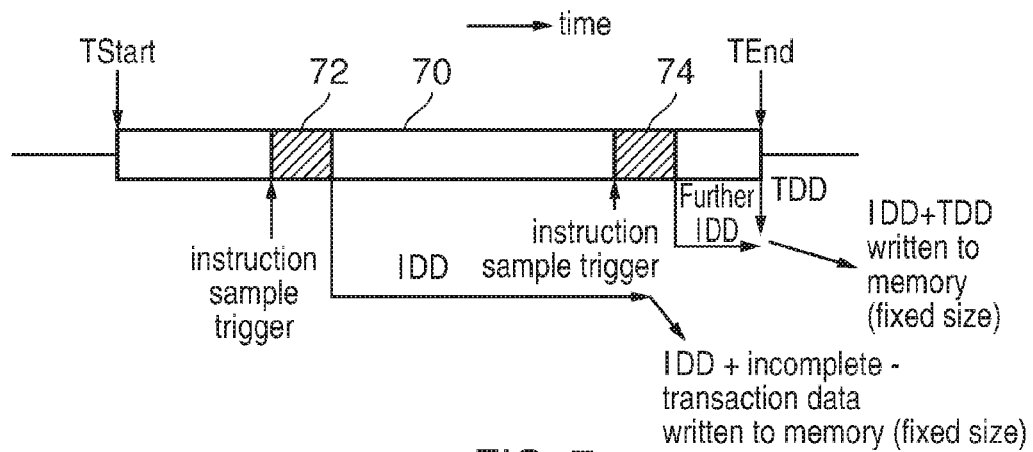
FIG. 7, illustrates a second example of generating and outputting diagnostic data and transaction diagnostic data.

FIG. 7 schematically illustrates a second example. In this example, a transaction 70 includes a sampled instruction 72 followed by a further sampled instruction 74. The sampled instruction 72 is identified by the occurrence of a first instruction sample trigger. The further sampled instruction 74 is identified by the occurrence of a further instruction sample trigger. The transaction 70 includes, in this example, two sampled instructions. The instruction diagnostic data (IDD) associated with the sampled instruction 72 is buffered without being output up to the start of the further sampled instruction 74. At that time, the instruction diagnostic data (IDD) for the sampled instruction 72 is output (e.g. to memory or a trace data stream as part of a fixed size data record) together with transaction diagnostic data (TDD) indicating that the transaction 70 including the sampled transaction 72 was at the time of the output of that transaction diagnostic data incomplete. This transaction diagnostic data (TDD) comprises incomplete-transaction data indicating the status, such as by use of an appropriate flag value.

When the instruction diagnostic data (IDD) for the sampled instruction 72 has been output, then this frees the buffer which was storing this data to then store further instruction diagnostic data associated with the further sampled instruction 74. This further instruction diagnostic data is buffered up to the end of the transaction 70 at which time it is output together with transaction diagnostic data indicating whether or not the transaction 70 was completed or aborted.

Figure 8:
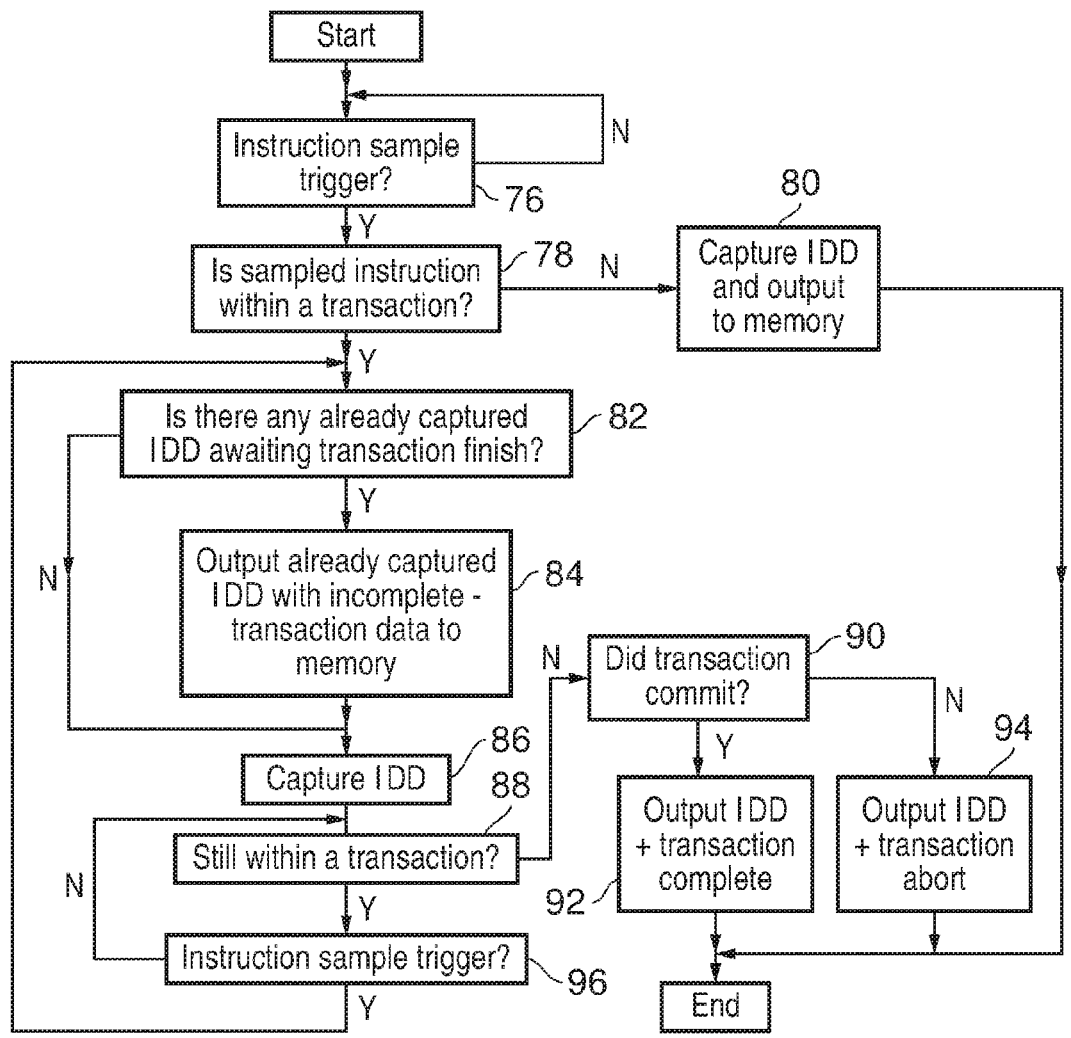
FIG. 8 is a flow diagram schematically illustrating control of the output of instruction diagnostic data and transaction diagnostic data in accordance with FIG. 7.

FIG. 8 is a flow diagram schematically illustrating the operation of the example of FIG. 7. At step 76 processing waits until an instruction sample trigger is received. Step 78 then determines whether or not the sampled instruction is within a transaction. If the sampled instruction is not within a transaction, then step 80 serves to capture the instruction diagnostic data (IDD) and output the instruction diagnostic data (IDD) at that time. If the determination at step 78 is that the sampled instruction is within a transaction, then processing proceeds to step 82 where a determination is made as to whether or not there is any already captured instruction diagnostic data (IDD) awaiting its associated transaction to finish. Such already captured instruction diagnostic data (IDD) would be stored within the buffer as previously mentioned. If there is such already captured instruction diagnostic data (IDD) awaiting its transaction to finish, then processing proceeds to step 84 where that already captured instruction diagnostic data (IDD) is output together with incomplete-transaction data (the incomplete-transaction data is a form of transaction diagnostic data). The buffer is then freed for storing instruction diagnostic data (IDD) associated with the latest instruction sample trigger. If the determination at step 82 is that there is not any already captured diagnostic data (IDD) awaiting its transaction to finish, or after step 84 has completed, then step 86 serves to capture the instruction diagnostic data (IDD) associated with the instruction for the sample instruction trigger identified at step 76. Step 88 then determines whether or not processing is still within a transaction, e.g. the transaction associated with the captured instruction diagnostic data (IDD) from step 88 has finished. If this transaction has finished, then step 90 determines whether or not that transaction committed. If the transaction committed, then step 92 outputs the instruction diagnostic data (IDD) together with transaction diagnostic data (TDD) indicating that the transaction completed. If the transaction did not commit, then step 94 serves to output instruction diagnostic data (IDD) together with transaction diagnostic data (TDD) indicating that the transaction aborted.

If the determination at step 88 is that processing is still within a transaction, then step 96 determines whether or not a further sample trigger has been received. If a further sample trigger has not been received, then processing returns to step 88. If a further sampled trigger is received, then processing returns to step 82.

Figure 9:
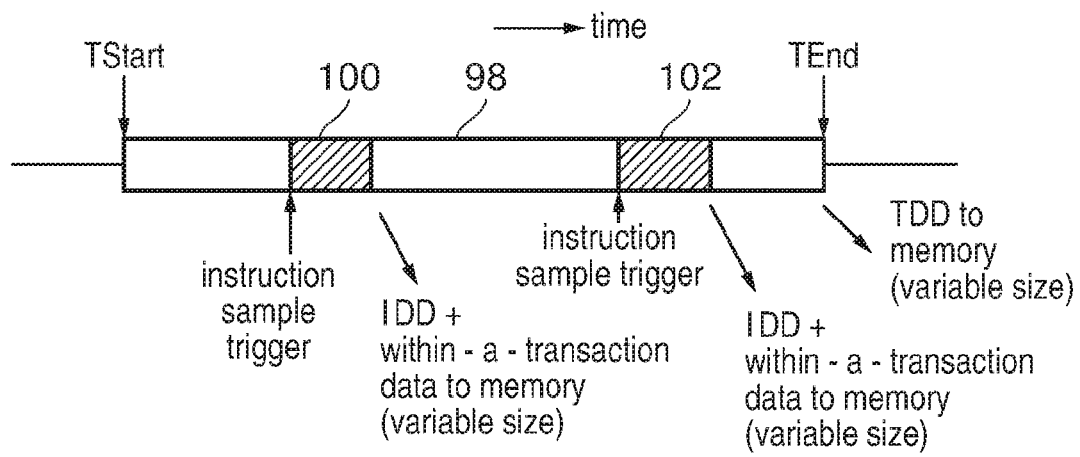
FIG. 9, illustrates a third example of generating and outputting diagnostic data and transaction diagnostic data.

FIG. 9 schematically illustrates a third example. In this third example a transaction 98 includes a first sampled instruction 100 and a second sampled instruction 102. Each of the sampled instructions 100, 102 is identified by an associated instruction sample trigger. After each of these sampled instructions has executed, then instruction diagnostic data (IDD) associated with that sampled instruction 100, 102 is output together with transaction diagnostic data (TDD) indicating that the sampled instruction 100, 102 is within-a-transaction (and possibly the transaction depth in a system supporting nested transactions). This instruction diagnostic data (IDD) and within-a-transaction data may be written as a variable size data record. As the instruction diagnostic data (IDD) is written out without waiting for the end of the transaction 98 no, or limited, buffering is required. When the transaction 98 completes, then further transaction diagnostic data (TDD) is written out to indicate whether or not the transaction 98 completed or aborted. This transaction diagnostic data (TDD) may again be written out as a variable-size data record.

Figure 10:
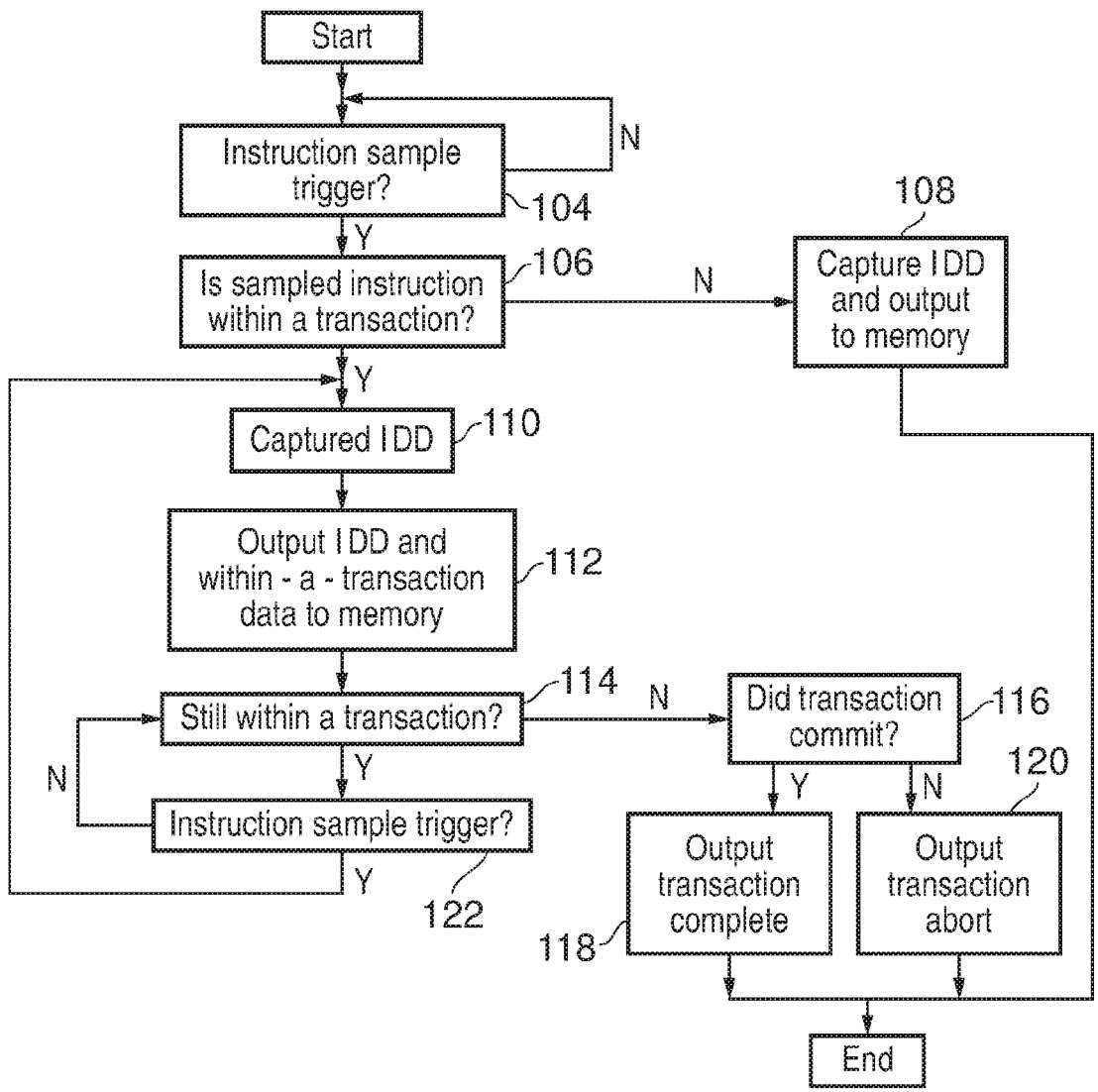
FIG. 10 is a flow diagram schematically illustrating control of the output of instruction diagnostic data and transaction diagnostic data in accordance with FIG. 9.

FIG. 10 is a flow diagram schematically illustrating the operation of the example of FIG. 9. At step 104 processing waits until an instruction sample trigger is received. Step 106 then determines whether or not the sampled instruction is within a transaction. If the sampled instruction is not within a transaction, then step 108 serves to capture instruction diagnostic data (IDD) for the sampled instruction and output this instruction diagnostic data (IDD).

If the sampled instruction is within a transaction as identified at step 106, then step 110 serves to capture instruction diagnostic data (IDD) associated with that sampled instruction. Step 112 then outputs the captured instruction diagnostic data together with transaction diagnostic data (TDD) in the form of within-a-transaction data to a memory or a trace data stream. Step 114 determines whether or not processing is still within a transaction. If processing is still not within a transaction, then step 116 determines whether or not the transaction committed (e.g. completed without a conflict). If the transaction did commit, then step 118 outputs transaction diagnostic data (TDD) indicating that the transaction was completed. If the transaction did not complete, then step 120 outputs transaction diagnostic data (TDD) indicating that the transaction aborted.

If the determination at step 114 is that processing is still within a transaction, then step 122 determines whether or not another sample trigger has occurred. If another sample trigger has not occurred, then processing returns to step 114. If another instruction sample trigger has occurred, then processing returns to step 110.

Figure 11:
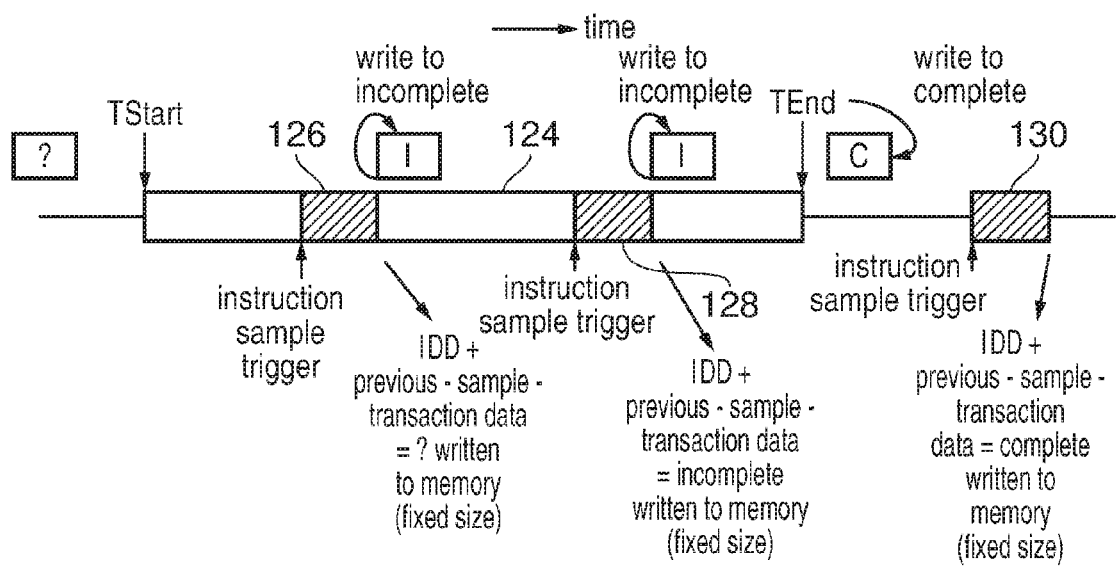
FIG. 11, illustrates a fourth example of generating and outputting diagnostic data and transaction diagnostic data.

FIG. 11 schematically illustrates a fourth example. In this example, a transaction 124 includes a first sampled instruction 126 and a second sampled instruction 128. A third sampled instruction 130 lies outside the transaction 124. As the instruction diagnostic data (IDD) is output for each sampled instruction 126, 128, 130, then this is accompanied by transaction diagnostic data (TDD) in the form of previous-sample-transaction data. This indicates the status of any transaction containing the previously sampled instruction. As illustrated in FIG. 11, the first sampled instruction 126 is accompanied by previous-sample-transaction data of an unknown form as the nature of the previous sampled instruction is not apparent from FIG. 11. At the time that the first sampled instruction 126 is executed, then state data for the previous-sample-transaction data is updated to indicate that the transaction 124 was incomplete at the time that the first sampled instruction 126 was executed. This previous-sampled-transaction data is not output at this time, but rather is output together with the instruction diagnostic data (IDD) captured and output for the second sampled instruction 128. The second sampled instruction 128 again updates the previous-sample-transaction data state to incomplete at the time that the second sampled instruction 128 is executed. When the transaction 124 completes, then a separate mechanism updates the previous-sample-transaction data to indicate the nature of the completion of the transaction, e.g. complete or abort. Accordingly, when the third sampled instruction 130 is executed and its instruction diagnostic data (IDD) is output, then the accompanying previous-sample-transaction data indicates either complete or abort.

Figure 12:
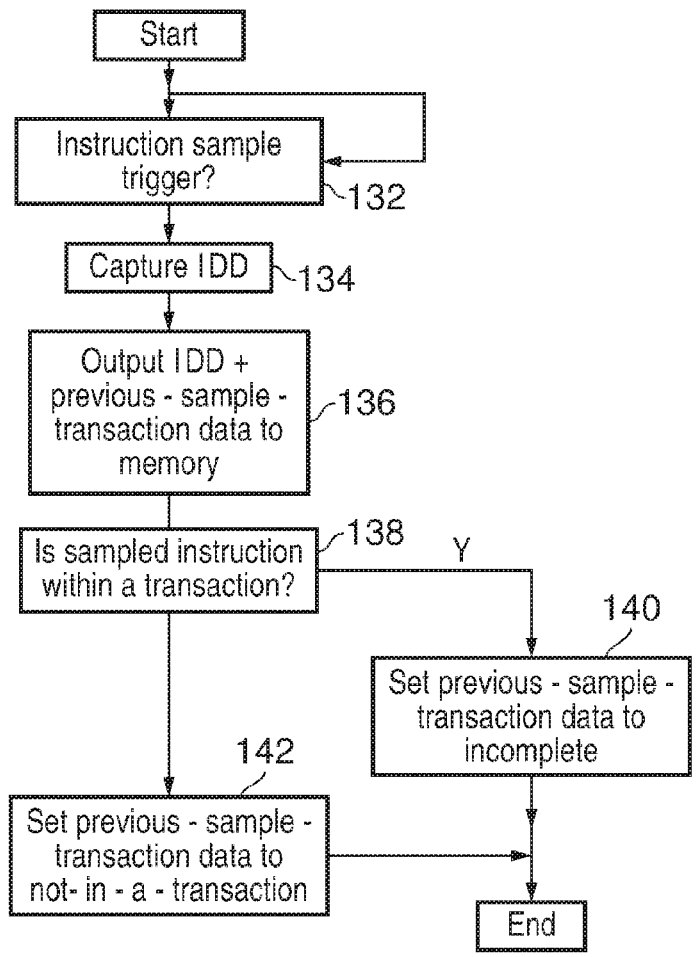
FIG. 12 is a flow diagram schematically illustrating control of the output of instruction diagnostic data and transaction diagnostic data in accordance with FIG. 11.

FIG. 12 is a flow diagram schematically illustrating the operation of the example of FIG. 11. At step 132 processing waits until an instruction sample trigger is encountered. When an instruction sample trigger has been encountered, then step 134 captures instruction diagnostic data (IDD) for the sampled instruction. Step 136 then outputs the captured instruction diagnostic data (IDD) together with previous-sample-transaction data to a memory or a trace data stream. Step 138 then determines whether or not the sampled instruction corresponding to the instruction sample trigger at step 132 is within a transaction. If the sampled instruction is within a transaction, then step 140 serves to set the previous-sample-transaction data state as stored by the system to "incomplete". If the determination at step 138 is that the sampled instruction is not within a transaction, then step 142 serves to set the previous-sample-transaction data state stored to "not-in-a-transaction".

Figure 13:
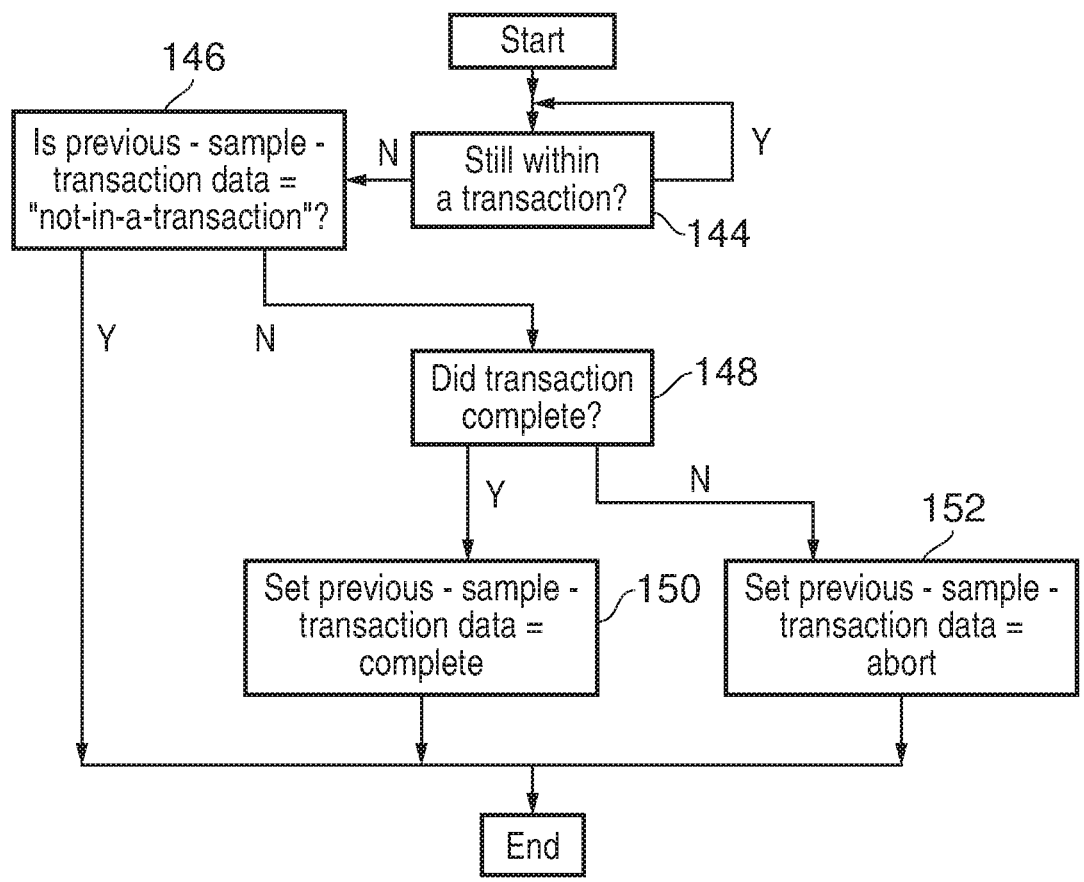
FIG. 13 is a flow diagram schematically illustrating the setting of previous-sample-transaction data when a transaction finishes.

FIG. 13 schematically illustrates the updating of the previous-sample-transaction data state when a transaction is detected as finishing by the transaction tracking circuitry 46. At step 144 a determination is made that processing is not still within a transaction. Step 146 then determines whether or not the previous sample-transaction data indicated "not-in-a-transaction". If this is true, then it indicates that the transaction which has just been detected as finishing at step 144 is not one which contained a sampled instruction and accordingly the previous-sample-transaction data is left as "not-in-a-transaction". If the determination at step 146 is that the previous-sample-transaction data does not equal "not-in-a-transaction", then processing proceeds to step 148 where a determination is made as to whether or not the transaction detected as finished at step 144 completed without a conflict. If the transaction did complete without a conflict, then step 150 sets the previous-sample-transaction data state to "complete". If the transaction did not complete without a conflict, then step 152 sets the previous-sample-transaction data state to "abort".

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data, said apparatus comprising:
    processing circuitry to execute program instructions including a transaction comprising a plurality of program instructions that execute to generate speculative updates to state data and to commit said speculative updates if said transaction completes without a conflict;

instruction sampling circuitry to capture instruction diagnostic data relating to execution of a sampled instruction by said processing circuitry; and transaction tracking circuitry:
- to detect if said sampled instruction is within said transaction; and
- if said sampled instruction is within said transaction, then to track whether said speculative updates are committed and to capture transaction diagnostic data indicative of whether said speculative updates were committed.

2. Apparatus as claimed in claim 1, wherein said transaction tracking circuitry is formed to write said transaction diagnostic data to a memory after transaction processing has finished.

3. Apparatus as claimed in claim 2, wherein said sampling circuitry is formed to write said instruction diagnostic data to said memory together with said transaction diagnostic data after transaction processing has finished.

4. Apparatus as claimed in claim 1, wherein said transaction tracking circuitry is formed to write said transaction diagnostic data to a trace data stream after transaction processing has finished.

5. Apparatus as claimed in claim 4, wherein said sampling circuitry is formed to write said instruction diagnostic data to said trace data stream together with said transaction diagnostic data after transaction processing has finished.

6. Apparatus as claimed in claim 1, wherein said transaction tracking circuitry and said sampling circuitry are formed to respond to capture of further instruction diagnostic data for a further sampled instruction within said transaction to write said instruction diagnostic data together with incomplete-transaction data indicating that transaction processing has not finished.

7. Apparatus as claimed in claim 1, wherein said transaction tracking circuitry and said sampling circuitry are formed to respond to capture of said instruction diagnostic data to write said instruction diagnostic data together with within-a-transaction data indicating that said sampled instruction is within said transaction.

8. Apparatus as claimed in claim 1, wherein said transaction tracking circuitry and said sampling circuitry are formed to respond to capture of further instruction diagnostic data for a further sampled instruction to write said further instruction diagnostic data together with previous-sample-transaction data indicating a status of said transaction including said sampled instruction.

9. Apparatus as claimed in claim 2, wherein said memory is used by memory access instructions within said program instructions executed by said processing circuitry.

10. Apparatus as claimed in claim 1, wherein said instruction diagnostic data and said transaction diagnostic data are written as one of:
- fixed size data records; and
- variable size data records.

11. Apparatus as claimed claim 1, wherein said transaction diagnostic data indicates one or more of:
said transaction completed such that said speculative updates were committed; said transaction aborted such that said speculative updates were not committed;
nesting depth;
said transaction has not yet finished; and
that said sampled instruction is within said transaction.

12. Apparatus as claim 1, wherein said sampling circuitry is formed to perform instruction diagnostic data capture at one of:
a fixed interval;
a random interval;
a sum of a fixed interval plus a random interval; and
in response to an external stimulus.

13. Apparatus as claimed claim 1, wherein said instruction diagnostic data includes one or more of:
a program counter value of said sampled instruction;
an exception level;
an virtual machine identifier;
a context identifier;
a translation table base address value;
a security state value;
a type of said sampled instruction;
whether said sampled instruction triggered a cache access;
whether said sampled instruction triggered a cache miss;
cycle count data associated with execution of at least part of said sample instruction; and
whether changes of architectural state associated with said instruction were committed.

14. Apparatus for processing data, said apparatus comprising:
processing means for executing program instructions including a transaction comprising a plurality of program instructions that execute to generate speculative updates to state data and to commit said speculative updates if said transaction completes without a conflict;
instruction sampling means for capturing instruction diagnostic data relating to execution of a sampled instruction by said processing circuitry; and
transaction tracking means:
for detecting if said sampled instruction is within said transaction; and
if said sampled instruction is within said transaction, then for tracking whether said speculative updates are committed and for capturing transaction diagnostic data indicative of whether said speculative updates were committed.

15. A method of processing data, said method comprising:
executing program instructions including a transaction comprising a plurality of program instructions that execute to generate speculative updates to state data and to commit said speculative updates if said transaction completes without a conflict;
capturing instruction diagnostic data relating to execution of a sampled instruction by said processing circuitry;
detecting if said sampled instruction is within said transaction; and
if said sampled instruction is within said transaction, then tracking whether said speculative updates are committed and capturing transaction diagnostic data indicative of whether said speculative updates were committed.

* * * * *